US006933029B2

(12) United States Patent
Ogino et al.

(10) Patent No.: US 6,933,029 B2
(45) Date of Patent: Aug. 23, 2005

(54) LABEL SHEET FOR ELECTROPHOTOGRAPHIC PROCESS AND IMAGE FORMING METHOD USING THE SAME

(75) Inventors: Takashi Ogino, Ebina (JP); Kiyoshi Hosoi, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 104 days.

(21) Appl. No.: 10/462,768

(22) Filed: Jun. 17, 2003

(65) Prior Publication Data

US 2004/0043176 A1 Mar. 4, 2004

(30) Foreign Application Priority Data

Jun. 25, 2002 (JP) ....................................... 2002-184108

(51) Int. Cl.$^{7}$ ................................................ B32B 33/00

(52) U.S. Cl. ...................... 428/40.1; 399/409; 503/200; 428/40.2; 428/40.3; 428/41.3; 428/41.8; 428/41.9; 428/352; 428/353; 428/354

(58) Field of Search .............................. 428/40.1, 40.2, 428/40.5, 41.3, 41.8, 41.9, 352, 353, 354; 399/409; 503/200

(56) References Cited

U.S. PATENT DOCUMENTS 4,942,410 A * 7/1990 Fitch et al. .............. 346/135.1
6,497,933 B1 * 12/2002 Yeager et al. .............. 428/41.8

FOREIGN PATENT DOCUMENTS

| | | |
|---|---|---|
| JP | A 6-95420 | 4/1994 |
| JP | A 6-301229 | 10/1994 |
| JP | A 6-301230 | 10/1994 |
| JP | A 6-301231 | 10/1994 |
| JP | A 6-332222 | 12/1994 |
| JP | A 6-337537 | 12/1994 |
| JP | A 7-9624 | 1/1995 |
| JP | A 7-248636 | 9/1995 |
| JP | A 7-271079 | 10/1995 |
| JP | B2 2659792 | 6/1997 |
| JP | B2 2772570 | 4/1998 |
| JP | A 2000-98647 | 4/2000 |
| JP | A 2000-250248 | 9/2000 |

* cited by examiner

*Primary Examiner*—Nasser Ahmad
(74) *Attorney, Agent, or Firm*—Oliff & Berridge, PLC

(57) ABSTRACT

A label sheet for electrophotographic process is composed of a label body in which an adhesive layer is formed on the back surface of a label base and a separator that is tentatively bonded to the label body with the adhesive layer interposed in between so as to be peelable from the label body. Both of the label base and a separator base are made of heat-resistant resin film. A toner accepting layer contains a release agent and has surface resistivity of $1\times10^{14}$ Ω/□ or more. An antistatic treatment layer has surface resistivity of $1\times10^{8}$ to $1\times10^{12}$ Ω/□.

19 Claims, 2 Drawing Sheets

LABEL SHEET FOR ELECTROPHOTOGRAPHIC PROCESS AND IMAGE FORMING METHOD USING THE SAME

BACKGROUND OF THE INVENTION

1. Field of the Invention

The present invention relates to a label sheet for an electrophotographic process that is used for indirect dry electrophotographic copiers and printers and an image forming method using it.

2. Description of the Related Art

With the development of color electrophotographic copiers and printers and digital ones, investigations have been made to increase the image quality and the processing speed of the electrophotographic process. In particular, in full-color electrophotographic copiers and printers, to increase the image quality and the processing speed, great progress has been made in the digitization of the image input/output technologies, whereby the image input method, the method for processing an input image, the development method, the transfer method, the fixing method, etc. have been improved very much. Further, developers and photoreceptor image forming materials have been improved to enable digital color printing that is high in resolution and color formation performance.

On the other hand, with the increase in the image quality of full-color copiers and printers, not only woodfree paper but also other various kinds of medium such as coated paper having a heavy basis weight, cast coated paper, plastic materials, and seal materials have come to be used as printing media. In particular, for seal and label materials, various uses such as labels and photographic seals have been proposed. However, woodfree-paper-based label paper cannot provide high-quality images because heated and melted toner tends to soak into it and, as a result, images appear tough and their gloss is not uniform.

To solve the above problem, as disclosed in Japanese Patent No. 2772570, an attempt to increase the image quality was made in which film having a very smooth surface is used as a label body. However, since coated paper is used as a separator, blisters may occur in the separator depending on the printing environment or after fixing the separator absorbs water and expands to form a large curl.

One method for solving this problem would be to use film for both of the label body and the separator. However, in this case, the entire label sheet becomes an insulator and hence a transfer failure tends to occur in toner transfer regions. To improve the toner transfer performance of label sheets made of film, JP-A Nos. 2000-250248, 6-337537, 6-332222, and 6-95420 proposed controlling the surface resistivity of label sheets by a surfactant. However, where a surfactant is used, the level of fixing of toner to the label sheet surface is low and hence toner is prone to peel off the film.

As disclosed in JP-A Nos. 6-301231, 6-301230, and 6-301229, it was attempted to attain satisfactory performance in both of the toner fixing and the toner transfer by controlling the surface resistivity of label sheets using a metal oxide. Although the toner fixing performance can be improved, a toner transfer failure tends to occur if the balance between the sure resistivity values of the front and rear surfaces of a label sheet is improper, that is, a case that the surface resistivity of the toner accepting surface is lower than the back surface and a case that both of the front and back surfaces have high surface resistivity. Even in a case that both of the font and back surfaces have low surface resistivity, a transfer failure tends to occur in a low-temperature, low-humidity environment. The above combinations of surface resistivity values of the front and back surfaces cannot provide satisfactory performance in both of the toner fixing and the toner transfer.

To eliminate gloss unevenness in the surface of a label sheet, Japanese Patent No. 2659792 and JP-A Nos. 2000-98647, 7-271079, 7-248636, 7-9624, and 6-332222 propose using a toner accepting layer for accepting a toner. However, since Tg (glass transition temperature) of a resin that forms the toner accepting layer is low, blocking may occur. Where this technique is applied to electrophotographic copiers and printers having an oilless fuser that is the mainstream nowadays, since the toner accepting layer tends to adhere to the roll of the oilless fuser, a label sheet may wind around the fixing roll to destroy it.

As described above, existing label sheets for electrophotographic process cannot satisfy all the requirements that satisfactory performance be attained in both of the toner transfer and the toner fixing, that winding of a label sheet around an oilless fuser be prevented, and that produced images have uniform gloss.

SUMMARY OF THE INVENTION

The present invention has been made in view of the above circumstances in the art, and provides a film-based label sheet for an electrophotographic process that can attain satisfactory performance in both of the toner transfer and the toner fixing because the probability of a transfer failure in a toner transfer region is much lower and the degree of toner fixation after fixing is higher than with conventional label sheets, that can provide uniform image gloss in spite of the fact that the label sheet can pass through even an oilless fuser, and that can be given specular gloss by a belt-type fixing device, as well as a related image forming method.

To improve the film-based label sheet for an electrophotographic process in the ability of passing through an oilless fuser, image gloss uniformity, and toner fixing/transfer performance, the inventors have intensively studied the toner transfer performance of film-based label sheets, the fixing performance of film-based sheets, structures including a toner accepting layer that is made of a thermoplastic resin, the ability of passing through an oilless fuser, and other items. As a result, the inventors have solved the above problems and completed the invention.

The invention provides a label sheet for an electrophotographic process that is composed of a label body and a separator. The label sheet has a label base containing heat-resistant resin film, an adhesive layer formed on the back surface of the label base, and a toner accepting layer that is formed on the front surface of the label base, is made of a thermoplastic resin whose storage elastic modulus at 130° C. is in a range of 4 to 250 Pa, has a thickness of 2 to 16 $\mu$m and surface resistivity of $1\times10^{14}$ Ω/□ or more, and contains a release agent. The separator is tentatively bonded to the label body with the adhesive layer interposed in between so as to be peelable from the label body, and has a separator base made of heat-resistant resin film, and an antistatic treatment layer that is formed on one surface of the separator base that is opposite to the other surface that is tentatively bonded to the label body, and has surface resistivity of $1\times10^{8}$ to $1\times10^{12}$ Ω/□.

The invention also provides an image forming method for forming an image on a label sheet for an electrophotographic process. The image forming method includes the steps of forming a latent image on a latent image holding body, developing the latent image using a toner, transferring a toner image to a front surface of the toner accepting layer of the above-described label sheet, and fixing the toner image on the toner accepting layer by heating and melting the toner image with a fixing device.

BRIEF DESCRIPTION OF THE DRAWINGS

Preferred embodiments of the present invention will be described in detail based on the following figures, wherein.

DESCRIPTION OF THE PREFERRED EMBODIMENTS

The present invention will be hereinafter described in detail such a manner that a label sheet for an electrophotographic process (hereinafter may be abbreviated as "label sheet") and an image forming method will be described separately.

<Label Sheet for Electrophotographic Process>

Figure 1:
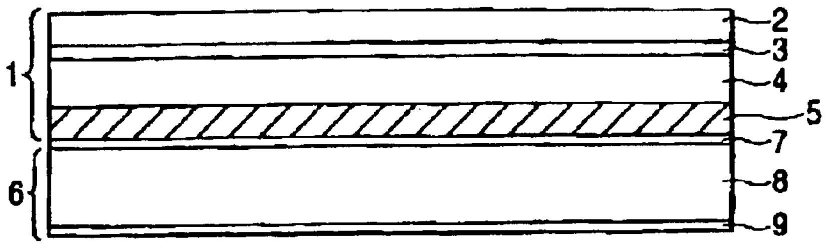
FIG. 1 is a schematic sectional view showing the structure of a label sheet for an electrophotographic process according to the present invention.

FIG. 1 is a schematic sectional view showing the structure of a label sheet according to the invention. As shown in FIG. 1, the label sheet is composed of a label body 1 that is formed by a label base 4, an anchor coat layer 3 provided on one surface of the label base 4, a toner accepting layer 2 that is provided on the front surface of the anchor coat layer 3, an adhesive layer 5 that is provided on the other surface (i.e., the surface on the side opposite to the toner accepting layer 2) of the label base 4, and a separator 6 that is adhered to the label base 4 with the adhesive layer 5 so as to be able to peel off the label base 4. The separator 6 is made of a separator base 8, a release layer 7 that is provided on that surface of the separator base 8 which is opposed to the adhesive layer 5, and an antistatic treatment layer 9 that is provided on the other surface (i.e., the surface on the side opposite to the release layer 7) of the separator base 8.

In the invention, the label base 4 is made of heat-resistant resin film, examples of which are plastic materials such as polyethylene terephthalate, polyethylene naphthalate, polycarbonate, polypropylene, polyimide, and polystyrene. To suppress shrinkage during heating and adjust the pure whiteness, it is preferable to add a filler such as titanium dioxide or calcium carbonate to such a resin.

It is preferable that that the thickness of the label base 4 be in a range of 25 to 150 μm, and an even preferable range is 40 to 100 μm. If the label base 4 is thinner than 25 μm, the label sheet may be difficult to handle as a label. If the label base 4 is thicker than 150 μm, the transfer/fixing performance in printers and copiers may deteriorate. It is preferable that the label base 4 be made of a plastic material that has been subjected to heat treatment and thereby heat-contracted.

The toner accepting layer 2 is made of a thermoplastic resin, examples of which are a polystyrene resin, styrene-vinyl acetate resin, an acrylic resin, a styrene-ester acrylate resin, a styrene-ester methacylate resin, a polyurethane resin, and polyester resin. The thickness of the toner accepting layer 2 needs to be in a range of 2 to 16 μm. If the toner accepting layer 2 is thinner than 2 μm, the toner burying characteristic is poor and the image gloss uniformity is low. If the toner accepting layer 2 is thicker than 16 μm, a toner offset phenomenon that the resin sticks to the fuser (fixing device) during heated fixing and winding of a label sheet around the fuser tend to occur. Further, the toner accepting layer 2 may peel off or a crack may develop there.

It is preferable that the thickness of the toner accepting layer 2 be in a range of 4 to 10 μm, and an even preferable range is 5 to 8 μm.

In the invention, the toner accepting layer 2 has a function of burying toner in itself when it is heated and melted by the fuser, to thereby remove relief of the toner and make the image gloss uniform.

The storage elastic modulus at 130° C. of the thermoplastic resin that is used as the toner accepting layer 2 needs to be in a range of 4 to 250 Pa. If the storage elastic modulus is smaller than 4 Pa, during heated fixing the resin becomes so soft that it tends to stick to the fuser. Therefore, the toner offset phenomenon and the winding of a label sheet around the fuser tend to occur. If the storage elastic modulus is greater than 250 Pa, the toner burying characteristic (buried in the toner accepting layer 2) is poor and the image gloss uniformity deteriorates.

It is preferable that the storage elastic modulus at 130° C. be in a range of 4 to 100 Pa.

The storage elastic modulus was measured at a frequency 10 rad/s by using the dynamic analyzer RDAII of Rheometrics Inc.

It is preferable that Tg of the thermoplastic resin that is used as the toner accepting layer 2 be in a range of 50 to 90° C. If Tg is lower than 50° C., the resin becomes sticky when a label sheet is put in a high-temperature environment. In the worst case, a label sheet is bonded to another material or label sheets are bonded to each other. If heat sink cooling of a belt-type fuser is insufficient, part of the resin layer may be bonded to the belt to cause gloss unevenness in an output label sheet. On the other hand, if Tg is higher than 90° C., the melting of the resin in the fuser may become insufficient and the gloss uniformity deteriorates.

To be provided with a release ability, the toner accepting layer 2 contains a release agent, examples of which are carnauba wax, rice wax, candelilla wax, paraffin wax, and olefin wax. The addition of the release agent increase the releasability from the fuser and hence decreases the probability of winding of a label sheet around the fuser. Since the release ability depends on die type of release agent, it is appropriate to adjust the amount of the release agent added so that the amount is suitable for its type.

It is preferable tat the content of the release agent be in a range of 1 to 5 mass % with respect to the entire toner accepting layer 2. If the content is greater than 5 mass %, the image gloss lowers and gloss unevenness likely occurs. If the content is smaller than 1 mass %, the effect of reducing the probability of winding around the fuser may be insufficient.

It is preferable that the melting point of the release agent be in a range of 50 to 90° C. If the melting point of the release agent is higher than 90° C., the melting of the release agent in the fuser is insufficient, as a result of which a label sheet may wind around the fuser or the gloss uniformity may deteriorate. If the melting point of the release agent is lower than 50° C., the toner accepting layer 2 becomes sticky when a label sheet is put in a high-temperature environment, as a result of which gloss unevenness may occur. If heat sink cooling of a belt-type fuser is insufficient, release agent may remain on the belt partially to cause gloss unevenness.

The surface resistivity of the toner accepting layer 2 needs to be higher than or equal to $1\times10^{14}$ Ω/□. On the other hand, the surface resistivity of the antistatic treatment layer 9 that is provided on that surface of the separator base 8 which is opposite to the surface that is bonded temporarily to the label body 1 needs to be in a range of $1\times10^{8}$ to $1\times10^{12}$ Ω/□. This combination of the surface resistivity values of the toner accepting layer 2 and the antistatic treatment layer 9 can improve the toner transfer performance.

After intensive studies, the inventors have found that where the toner transfer performance is improved by controlling the surface resistivity of the toner accepting layer 2 with a surfactant, the toner fixing performance is poor and toner tends to peel off the film. The inventors have also found that even if it is attempted to attain satisfactory performance in both of the toner transfer and the toner fixing by controlling the surface resistivity of the toner accepting layer 2 by adding a metal oxide, a toner transfer failure tends to occur in both of a case that the surface resistivity of the toner accepting layer 2 is lower than that of the back surface of the label sheet and a case that the surface resistivity values of the two surfaces are high or low though the toner fixing performance can be improved. That is, the inventors have found that toner can be transferred stably and good toner fixing performance can be secured (i.e., satisfactory performance can be attained in both of the toner transfer and the toner fixing) if the surface resistivity of the toner accepting layer 2 is higher than or equal to $1\times10^{14}$ Ω/□ and the surface resistivity of the back surface (i.e., the surface opposite to the toner accepting layer 2) of the label sheet is in a range of $1\times10^{8}$ to $1\times10^{12}$ Ω/□.

The above described combination that the surface resistivity of the toner accepting layer 2 is high and the surface resistivity of the back-side antistatic treatment layer 9 is low is necessary also from the viewpoint of the structure of the label sheet according to the invention. That is, as described above, in the label sheet according to the invention, both of the label base 4 and the separator base 8 are made of a resin and the adhesive layer 5 and the release layer 7 are provided in between. When images are formed on label sheets having this structure with au electrophotographic apparatus described below, a multiple feed of label sheets likely occurs due to electrostatic sticking of the sheets. In addition, the label base 4 and the separator base 8 are likely separated from each other at the release layer 7.

To solve the above problems, that is, to weaken the electrostatic sticking force, it is necessary that at least one surface of the label sheet has low surface resistivity. As described above, in the label sheet according to the invention, with the understanding that low surface resistivity of the toner accepting layer 2 is not preferable, the surface resistivity of the antistatic treatment layer 9 is made lower than the prescribed value, whereby not only the toner transfer performance and the toner fixing performance but also the sheet transport/holding performance can be made stable.

It is preferable that the surface resistivity of the antistatic treatment layer 9 be in a range of $1\times10^{9}$ to $1\times10^{11}$ Ω/□.

Surface resistivity values are measured in an environment of 23° C. and 50% RH by a method according to JIS-K-6911.

A metal oxide or the like may be added to the toner accepting layer 2 in such a degree as not to lower the surface resistivity. The surface resistivity of the antistatic treatment layer 9 may be set in the above range by adding a proper one or ones of various surfactants, metal oxides powder, etc.

It is better to provide the anchor coat layer 3 between the tone accepting layer 2 and the label base 4. There may occur a case that the adhesiveness between the toner accepting layer 2 and the label base 4 is low, in which case the toner accepting layer 2 is not bonded strongly to the label base 4 if the anchor coat layer 3 is not provided and the toner accepting layer 2 may peel off the latter when the label sheet is deformed.

The adhesive layer 5, which is provided on the back surface of the label base 4 that is on the side opposite to the toner accepting layer 2, may be made of an acrylic, rubber-type, or like adhesive. It is preferable that the coating thickness of the adhesive layer 5 be in a range of 5 to 30 μm, and an even preferable range is 10 to 20 μm. If the thickness of the adhesive layer 5 is greater than the above range, the adhesive may come out of the label sheet end faces and pollute the inside of a copier or printer, possibly causing a sheet feed failure or the like. If the thickness of the adhesive layer 5 is smaller than the above range, the adhesion is insufficient. When a label sheet is rubbed inside a copier or printer, the separator 6 and the label body 1 may separate from each other and stick to a member inside the copier or printer, possibly causing a sheet feed failure.

Like the label base 4, the separator base 8 according to the invention is made of heat-resistant resin film, examples of which are polymer film materials such as polyethylene terephthalate, polyethylene naphthalate, polycarbonate, polypropylene, polyimide, and polystyrene and film materials in which a filler or the like is added to the above polymer film materials. It is preferable that the separator base 8 be made of a material that remains heat resistant even at 100° C. or more.

It is preferable that the thickness of the separator base 8 be in a range of 25 to 150 μm, and an even preferable range is 50 to 100 μm. If the separator base 8 is thinner than 25 μm, the label sheet may be difficult to handle as a label. If the separator base 8 is thicker than 150 μm, the transfer/fixing performance in printers and copiers may deteriorate.

The release layer 7, which is provided on the front surface of the separator base 8, may be formed as a coat of an ultraviolet-curing silicone resin, a thermosetting silicone resin, or the like. A typical range of the thickness of the release layer 7 is 0.05 to 1 μm. However, the thickness of the release layer 7 is not limited to this range.

<Image Forming Method>

The image forming method according to the invention is an image forming method using the above-described label sheet for electrophotographic process according to the invention, and includes at least a transfer step of transferring a toner image to the surface of the toner accepting layer of the label body and a fixing step of fixing the toner image on the toner accepting layer by heating and melting the toner image with a fixing device.

The image forming method according to the invention is suitably applied to color image forming methods using color toners (exemplified below). However, the image forming method according to the invention is not limited to color image forming methods and can also be applied to image forming methods using a monochrome toner.

Figure 2:
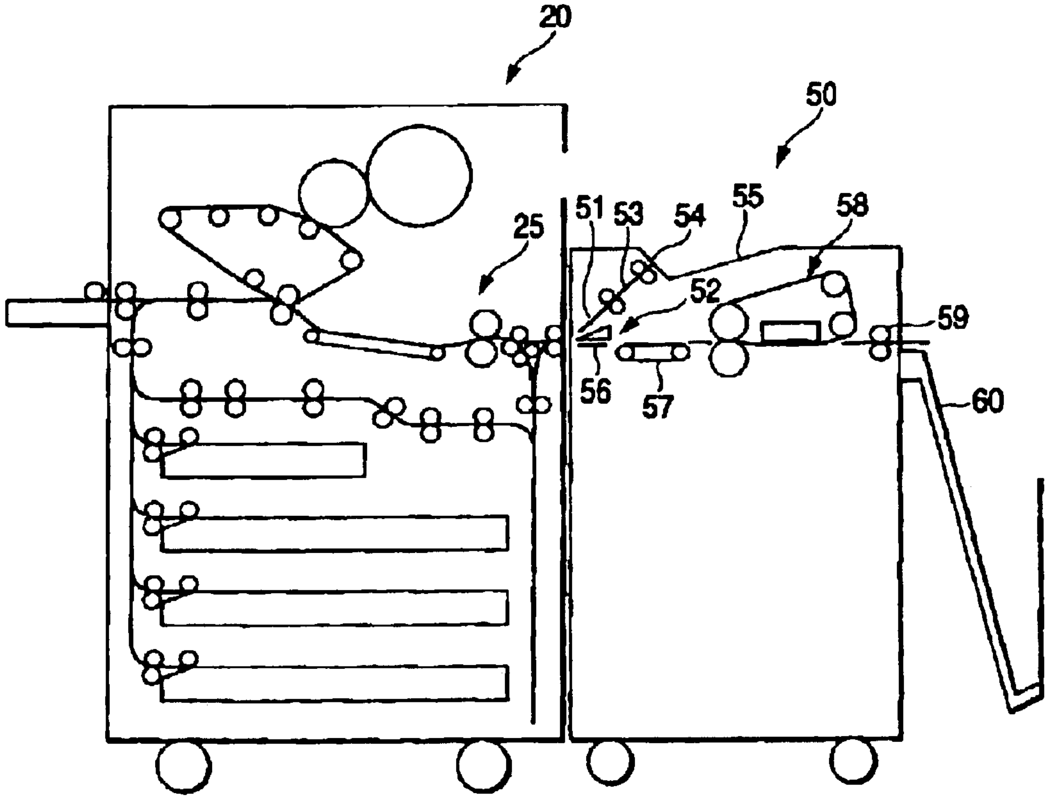
FIG. 2 schematically shows the configuration of an exemplary color image forming apparatus that is used in an image forming method according to the invention.

FIG. 2 schematically shows the configuration of an exemplary color image forming apparatus that is used in the image forming method according to the invention. The color image forming apparatus is composed of a color image forming apparatus main body 20 (shown in the left part of FIG. 2) incorporating a fixing device 25 and a secondary fixing unit 50 (shown in the right part in FIG. 2) incorporating a belt-type fixing device 58.

An exemplary image forming method according to the invention that is executed by using the color image forming apparatus main body 20 shown in FIG. 2, the fixing device 25 which is incorporated in the color image forming apparatus main body 20, and the belt-type fixing device 58 which is incorporated in the secondary fixing unit 50 will be described below.

A toner image forming step of forming a toner image on the surface of the label body of a label sheet using toners is executed by the color image forming apparatus main body 20. The toner image forming step consists of at least a latent image forming step of forming a latent image on a latent image holding body, a developing step of producing a toner image by developing the latent image using a developer for electrophotographic process that includes a toner, and a transfer step of transferring the developed toner image to the label body of the label sheet.

In the fixing step, the toners are fixed by heating and melting the toners with the fixing device 25 which is incorporated in the color image forming apparatus main body 20. Alternatively, the fixing step may be executed by using, instead of the fixing device 25, a fixing device whose function and configuration are equivalent to those of the belt-type fixing device 58.

In this embodiment, the fixing step is a step in which primary fixing is performed by using the fixing device 25 and secondary fixing is performed by using the secondary fixing unit 50, more specifically, the belt-type fixing device 58 which is incorporated in the secondary fixing unit 50.

A full-color toner image is transferred to and fixed on the surface of a label sheet for electrophotographic process according to the invention having the above-described structure by the color image forming apparatus main body 20 shown in FIG. 2. In this embodiment, the label sheet for electrophotographic process to and on which the full-color toner image has been transferred and fixed is subjected to secondary fixing in the belt-type fixing device 58. The belt-type fixing device 58 may be provided in the color image forming apparatus main body 20 in place of the fixing device 25 rather than is used as the fixing device for the secondary fixing. In this case, it is not necessary to perform secondary fixing.

The secondary fixing unit 50 has an inlet 51 through which a label sheet for electrophotographic process that is ejected from the color image forming apparatus main body 20 is input. Inside the secondary fixing unit 50, a switching gate 52 for switching between label sheet transport as is disposed close to the inlet 51. Where a label sheet that is ejected from the color image forming apparatus main body 20 is not subject to secondary fixing and is ejected to a first section tray 55 as it is, the switching gate 52 makes switching to an upper, first transport path 53 and the label sheet is ejected to the first ejection tray 55 by ejection rolls 54.

On the other hand, where a label sheet that is ejected from the color image forming apparatus main body 20 is subjected to secondary fixing, the switching gate 52 makes switching to a lower, second transport path 56 and the label sheet is transported to the belt-type fixing device 58 by a transport belt 57. The label sheet is fixed by the belt-type fixing device 58 and ejected to a second ejection tray 60 by ejection rolls 59.

Figure 3:
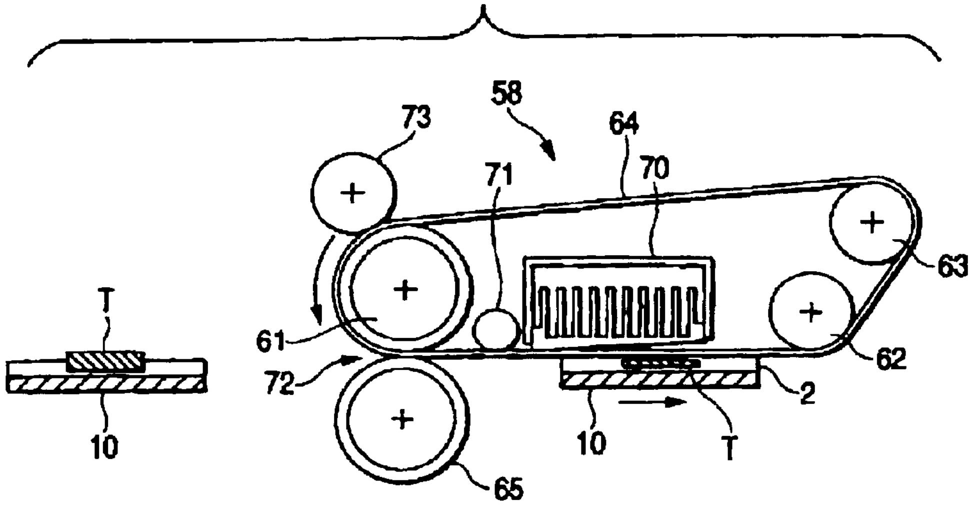
FIG. 3 is a schematic sectional view of a belt-type fixing device that is provided inside a secondary fixing unit of the color image forming apparatus of FIG. 2.

FIG. 3 is a schematic sectional view of the belt-type fixing device 58 which is provided inside the secondary fixing unit 50.

As shown in FIG. 3, the belt-type fixing device 58 is provided with a fixing belt 64 that is tensely wound on three rolls (a heating roll 61, a peeling roll 62, and a steering roll 63) in a rotatable manner and a pressure roll 65 that is pressed against the heating roll 61 with the fixing belt 64 interposed in between.

The fixing by the belt-type fixing device 58 is performed in the following manner. As a label sheet for electrophotographic process passes through a pressure contact portion 72 between the fixing belt 64 and the pressure roll 65 in such a manner that a toner image is located on the fixing belt 64 side, the toner image is heated and pressed and is thereby fixed. The label sheet is peeled off the fixing belt 64 in a state that the fixing belt 64 is cooled to some extent.

Figure 4:
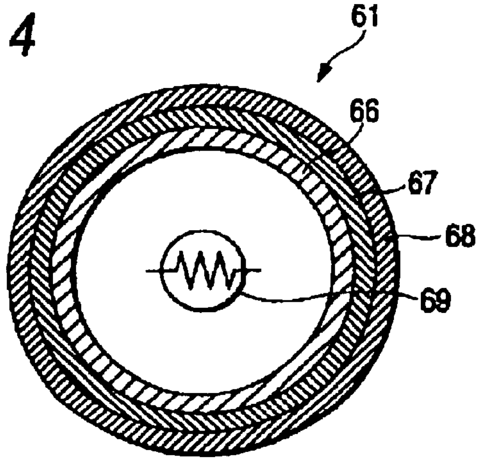
FIG. 4 is a schematic sectional view of a heating roll or a pressure roll of the belt-type fixing device of FIG. 3.

Next, the stares and the functions of respective components of the belt-type fixing device 58 will be described in detail. FIG. 4 is a schematic sectional view of the heating roll 61 or the pressure roll 65 of the belt-type fixing device 58 of FIG. 3. For example, the heating roll 61 is configured in the following manner. The surface of a metal core 66 made of aluminum, stainless steel, or the like is covered with an elastic layer 67 made of, for example, silicone rubber whose rubber hardness as measured according to JIS K6253 is preferably in a range of 20° to 60°, at a thickness that is preferably in a range of 1 to 3 mm. The surface of the elastic layer 67 is covered with a release layer 68 that is a PFA tube or the like, whereby a prescribed diameter is obtained.

A halogen lamp 69 that generates heat preferably at a rate of 300 to 350 W is provided, as a heating source, inside the heating roll 61. The halogen lamp 69 heats the heating roll 61 so as to set its surface temperature at a prescribed temperature (preferably in a range of 130 to 195° C.).

For example, as shown in FIG. 4, the pressure roll 65 has the same structure as the heating roll 61. The surface of a metal core 66 made of aluminum, stainless steel, or the like is covered with an elastic layer 67 made of, for example, silicone rubber whose rubber hardness as measured according to JIS K6253 is preferably in a range of 20° to 60°, at a thickness that is preferably in a range of 1 to 3 mm. The surface of the elastic layer 67 is covered with a release layer 68 that is a PFA tube or the like, whereby a prescribed diameter is obtained.

A halogen lamp 69 that generates heat preferably at a rate of 300 to 350 W is provided, as a heating source, inside the pressure roll 65. The halogen lamp 69 heats, from inside, the pressure roll 65 so as to set its surface temperature at a prescribed temperature (preferably in a range of 85 to 155° C.). In the case of the pressure roll 65, the heating source may be omitted.

The heating roll 61 and the pressure roll 65 are brought in pressure contact with each other with the fixing belt 64 interposed in between by a pressing unit (not shown) with a nip pressure that is preferably in a range of 100 to 200 kPa.

As described above, the fixing belt 64 is tensely wound on the three rolls (beating roll 61, peeling roll 62, and steering roll 63) in a rotatable manner. The fixing belt 64 is rotated at a prescribed moving speed by the heating roll 61 that is driven rotationally by a driving source (not shown). For example, the fixing belt 64 is configured in such a manner that an 80-$\mu$m thick, polyimide endless film is covered with a 50-$\mu$m thick silicone rubber layer.

A cooling heat sink 70 for forcibly cooling the fixing belt 64 is provided inside the fixing belt 64 between the heating roll 61 and the peeling roll 62. The cooling heat sink 70 cools a label sheet that has just been subjected to fixing and is in close contact with the fixing belt 64. The fixing belt 64 is cooled so as to have a temperature in a range of 50 to 80° C. in the vicinity of the peeling roll 62.

A small-diameter tension roll 71 for giving prescribed tension to the fixing belt 64 is provided between the cooling heat sink 70 and the heating roll 61.

Next, a label sheet fixing process according to the invention that is executed by the belt-type fixing device 58 will be described in detail.

As shown in FIG. 3, a label sheet 10 to which a color toner image T has been transferred or that has been subjected to fixing once after transfer of a color toner image T passes though the pressure contact portion 72 left to right (in FIG. 3). At this time, the label sheet 10 enters the pressure contact portion 72 with the color toner image T located on the heating roll 61 side. As the label sheet 10 passes through the pressure contact portion 71, the color toner image T is heated and melted on the label sheet 10 and is thereby fixed. At the same time, the toner accepting layer 2 at the surface of the label sheet 10 is heated and softened and hence the label sheet 10 comes into close contact with the surface of the fixing belt 64.

Then, the label sheet 10 is transported together with the fixing belt 64 while being in close contact with the surface of the fixing belt 64. During that course, that part of the fixing belt 64 which is in the vicinity of the label sheet 10 is forcibly cooled by the cooling heat sink 70 and the toner accepting layer 2 on which the color toner image T is fixed is also cooled and is thereby solidified. The cooled label sheet 10 restores its sturdiness, as a result of which the label sheet 10 that has been in close contact with the fixing belt 64 is peeled off the fixing belt 64 by the peeling roll 62. A cleaner 73 removes residual toner etc. from the surface of the part of the fixing belt 64 from which the label sheet 10 has been peeled, to prepare for the next fixing operation.

The label sheet according to the invention that is to be subjected to the above-described fixing process is composed of a label body and a separator. The label sheet comprises a label base made of heat-resistant resin film, an adhesive layer formed on the back surface of the label base, and a toner accepting layer that is formed on the front surface of the label base, is made of a thermoplastic resin whose storage elastic modulus at 130° C. is in a range of 4 to 250 Pa, has a thickness of 2 to 16 μm and surface resistivity of $1\times10^{14}$ Ω/□ or more, and contains a release agent. The separator is tentatively bonded to the label body with the adhesive layer interposed in between so as to be peelable from the label body, and comprises a separator base made of heat-resistant resin film, and an antistatic treatment layer that is formed on one surface of the separator base that is opposite to the other surface that is tentatively bonded to the label body, and has surface resistivity of $1\times10^{8}$ to $1\times10^{12}$ Ω/□. Therefore, when fixed by the fixing device 25 of the color image forming apparatus main body 20, a label sheet to which a toner image has been transferred in the above-described manner by the color image forming apparatus main body 20 does not wind around the fixing device 25 and is not given a winding trace because the toner accepting layer has a release ability.

When a label sheet according to the invention is subjected to secondary fixing by the belt-type fixing device 58 after being subjected to primary fixing by the fixing device 25, a toner image is buried in the toner accepting layer. The label sheet is cooled by the cooling heat sink 70 with the toner image kept buried in the toner accepting layer, and the label sheet is then peeled by the peeling roll 62. As a result, the image gloss is highly uniform and specular gloss is obtained.

EXAMPLES

The invention will be hereinafter described in a more specific manner by using examples. However, the invention is not limited to the following examples. In the following Examples and Comparative Examples, the term "parts" means parts by mass unless otherwise specified.

Example 1

(Production of Label Sheet for Electrophotographic Process)

Polyethylene terephthalate film (white PET film A; thickness: 50 μm) that had been suppressed in thermal shrinkage in advance by subjecting it to heat treatment was used as a label base. After all anchor coat layer was applied to the surface of a roll-shaped label base and the dried, a toner accepting layer coating liquid having the following composition was applied to the surface of the anchor coat layer with a coater so as to provide a thickness (after drying) of 7 μm and then dried A resulting label body having a toner accepting layer was taken up into a roll.

Toner accepting layer coating liquid

- Polyester resin (Tafton NE382 of Kao Corp.; Tg: 60° C.; storage elastic modulus: 4 Pa): 10 parts
- Release agent (high-melting-point pain wax HNP-9 of Nippon Seiro Co., Ltd.; melting point: 75° C.): 0.2 part
- Toluene: 90 parts Heat-resistant polyethylene terephthalate film Z (thickness: 75 μm) that had been reduced in thermal shrinkage in advance by subjecting it to heat treatment was used as a separator base. To form an antistatic treatment layer, a coating liquid having the following composition was applied to one surface of the separator base so as to provide a thickness (after drying) of 0.5 μm:

- Polyester resin (Vylonal MD-1930 of Toyobo Co., Ltd.): 90 g
- Mat agent (PMMA): 50 g
- Cation-type surfactant (Elegan264-WAX of NOF Corp.): 1.0 g
- Water: 10,000 g Further, a 0.5-μm thick silicone resin layer was formed, as a release layer, on that surface of the separator base which was opposite to the surface on which the antistatic treatment layer was formed. A separator was thus formed.

Subsequently, an adhesive layer was formed on the surface of the release layer by applying an acrylic adhesive solution with a coater so as to provide a thickness (after drying) of 15 μm and then drying it. Then, the surface of the separator on which the adhesive layer was formed and that surface of the label body (wound in roll form) which was opposite to the toner accepting layer were bonded to each other with a laminator in such a manner as to avoid introduction of air into the adhesive layer. Label sheet-1 for electrophotographic process was thus produced.

In an environment of 23° C. and 50% RH, the toner accepting layer had surface resistivity of $4\times10^{14}$ Ω/□ and the antistatic treatment layer had surface resistivity of $1\times10^{11}$ Ω/□.

(Evaluation of Quality of Label Sheet for Electrophotographic Process)

In an ordinary temperature/humidity environment (22° C., 5.5% RH), by using a color printer DocuCentre Color 500 of Fuji Xerox Co., Ltd (see FIG. 2), a toner image was transferred to the surface of label sheet-1 that had been produced in the above-described manner, fixed primarily with the fuser 25, and then fixed secondarily with the belt-type fixing device 58. The blocking, toner transfer performance, toner image gloss uniformity, toner fixing performance, and occurrence/non-occurrence of a winding trouble in the primary fuser and the secondary fuser were evaluated in the following manner.

Evaluation of Blocking

Fixed label sheets were stacked and a weight was placed thereon so as to produce a pressure of $7.85\times10^3$ N/m$^2$. The label sheets were left as they were for one week in a dry environment of 40° C. The blocking was evaluated visually by the following criteria:

A: Label sheets are not bonded to each other and the gloss of the toner accepting layer does not decrease. Appropriate for practical use.

A$^+$: Label sheets are not bonded to each other but the gloss of the toner accepting layer decreases slightly. Appropriate for practical use.

B: Label sheets are not bonded to each other but the gloss of the toner accepting layer decreases. Not appropriate for practical use.

C: Label sheets are bonded to each other. Not appropriate for practical use.

Evaluation of Toner Transfer Performance

An image was formed on label sheet-1 by using a chart that has blue secondary colors and tertiary colors of yellow, magenta, and cyan and enables output image regions having dot coverages of 0 to 100% (steps: 10%). The toner transfer unevenness was evaluated visually by the following criteria:

A: There is no toner transfer unevenness and the transfer-performance is very good. Appropriate for practical use.

A$^-$: There is almost no toner transfer unevenness and the transfer performance is good. Appropriate for practical use.

B: Several uneven toner transfer portions are found and the transfer performance is a little low. Not appropriate for practical use.

C: Many uneven toner transfer portions are found and the transfer performance is poor. Not appropriate for practical use.

Evaluation of Image Gloss Uniformity

An image was formed on label sheet-1 by using a chart that has yellow, magenta, and cyan primary colors, secondary colors of red, green, and blue, and tertiary colors of yellow, magenta, and cyan and enables output of image regions having dot coverages of 0 to 100% (steps: 10%). The image gloss uniformity was evaluated visually by the following criteria:

A: There is no gloss unevenness and the image gloss uniformity is very high. Appropriate for practical use.

A$^-$: There is almost no gloss unevenness and the image gloss uniformity is high. Appropriate for pascal use.

B: Several uneven gloss portions are found and the image gloss uniformity is a little low. Not appropriate for practical use.

C: Many uneven gloss portions are found and the image gloss uniformity is low. Not appropriate for practical use.

Evaluation of Toner Filing Performance

Figures 5A, 5B, 5C:
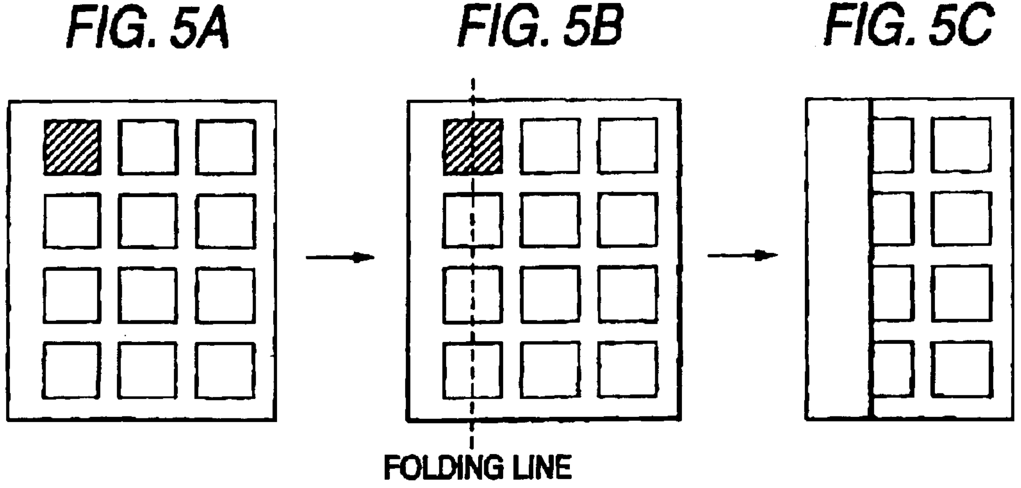
FIGS. 5A–5C schematically illustrate a method for evaluating the toner fixing performance of a label sheet for an electrophotographic process according to the invention.

An image having 2 cm×2 cm image regions of tertiary colors of yellow, magenta, and cyan with a 100% dot coverage was formed as shown in FIG. 5A. Label sheet-1 bearing the image was folded as shown in FIG. 5C along a broken line shown in FIG. 5B. A cylindrical weight of 470 g having a width of 3 cm and a diameter of 5 cm was rolled down the folded portion of label sheet-1. Then, Label sheet-1 was unfolded. The degree of toner peeling was evaluated visually and by rubbing the label sheet-1 with bencot.

A: No peeling.

B: Toner peels off slightly. Appropriate for practical use.

C: Toner is peeled easily by weak rubbing.

Check of Winding Around Primary Fuser

Whether label sheet-1 wound around the primary fuser immediately after being output from it and whether there occur an uneven gloss portion due to a failure of peeling from the fuser were checked visually by the following criteria:

A: No winding around the fuser occurs and there is no gloss unevenness due to a failure of peeling from the fuser. Appropriate for practical use.

A$^+$: No winding around the fuser occurs but there is slight gloss unevenness due to a failure of peeling from the fuser. Appropriate for practical use.

B: No winding around the fuser occurs but there is gloss unevenness due to a failure of peeling from the fuser. Not appropriate for practical use.

C: Winding around the fuser occurs. Not appropriate for practical use.

Check of Winding Around Secondary Fuser

Whether serious trouble occurred in the secondary fuser during secondary fixing was checked by the following criteria:

A: Neither pollution of the fixing belt nor image quality failure occurs. Appropriate for practical use.

A$^-$: Slight pollution of the fixing belt or a slight image quality failure occurs. Appropriate for practical use.

B: Pollution of the fixing belt or an image quality failure occurs. Not appropriate for practical use.

C: A label sheet peels off the fixing belt or a sheet jam occurs due to winding around the fuser. Not appropriate for practical use.

Results of the above evaluations and checks are shown in Tables 1 and 2.

Example 2

Label sheet-2 was produced in the same manner as in Example 1 except that a toner accepting layer liquid was applied so as to provide a thickness (after drying) of 3 $\mu$m, and was evaluated in the same manner as in Example 1. Results are shown in Tables 1 and 2.

Example 3

Label sheet-3 was produced in the same manner as in Example 1 except that the release agent was changed to rice bran wax TOA-R01 of Toa Kasei Co., Ltd. (melting point: 82° C.), and was evaluated in the same manner as in Example 1. Results are shown in Tables 1 and 2.

Example 4

Label sheet-4 was produced in the same manner as in Example 1 except that the amount of addition of the release agent was changed to 5 pats, and was evaluated in the same manner as in Example 1. Results are shown in Tables 1 and 2.

Example 5

Label sheet-5 was produced in the same manner as in Example 1 except that to form an antistatic treatment layer a coating liquid having the following composition was applied so as to provide a thickness (after drying) of 0.5 $\mu$m and surface resistivity of $2\times10^3$ Ω/□, and was evaluated m the same manner as in Example 1. Results are shown in Tables 1 and 2.

Polyester resin (Vylonal MD-1930 of Toyobo Co., Ltd.): 90 g

Matting agent (PMMA): 50 g

Cation-type surfactant (Elegan264-WAX of NOF Corp.): 2.0 g

Water: 10,000 g

Example 6

Label sheet-6 was produced in the same manner as in Example 1 except that the toner accepting layer liquid was applied so as to provide a thickness of 15 μm, and was evaluated in the same manner as in Example 1. Results are shown in Tables 1 and 2.

Example 7

Label sheet-7 was produced in the same manner as in Example 1 except that the release agent was changed to paraffin wax 130 of Nippon Seiro Co., Ltd. (melting point: 55° C.), and was evaluated in the same manner as in Example 1. Results are shown in Tables 1 and 2.

Example 8

Polyethylene terephthalate film (white PET film A; thickness: 50 μm) that had been suppressed in thermal shrinkage in advance by subjecting it to heat treatment was used as a label base. After an anchor coat layer was applied to the surface of a roll-shaped label base and then dried, a toner accepting layer coating liquid having the following composition was applied to the surface of the anchor coat layer with a coater so as to provide a thickness (after drying) of 7 μm and then dried. A resulting label body having a toner accepting layer was taken up into a roll.

Toner accepting layer coating liquid

Polyester resin FDX-2 of Kao Corp. (Tg: 70° C.; storage elastic modulus: 250 Pa): 10 parts Release agent (high-melting-point paraffin wax HNP-9 of Nippon Seiro Co., Ltd.; melting point: 75° C.): 0.2 part Toluene: 90 parts Heat-resistant polyethylene terephthalate film Z (thickness: 75 μm) that had been reduced in thermal shrinkage in advance by subjecting it to heat treatment was used as a separator base. To form an antistatic treatment layer, a coating liquid having the following composition was applied to one surface of the separator base so as to provide a thickness (after drying) of 0.5 μm:

Polyester resin (Vylonal MD-1930 of Toyobo Co., Ltd.): 90 g

Matting agent (PMMA): 50 g

Cation-type surfactant (Elegan 264-WAX of NOF Corp.): 1.5 g

Water: 10,000 g

Further, a 0.5-μm thick silicone resin layer was formed, as a release layer, on that surface of the separator base which was opposite to the surface on which the antistatic treatment layer was formed. A separator was thus formed.

Subsequently, an adhesive layer was formed on the surface of the release layer by applying an acrylic adhesive solution with a coater so as to provide a thickness (after drying) of 15 μm and then drying it. Then, the surface of the separator on which the adhesive layer was formed and that surface of the label body (wound in roll form) which was opposite to the toner accepting layer were bonded to each other with a laminator in such a manner as to avoid introduction of air into the adhesive layer. Label sheet-8 was thus produced.

In an environment of 23° C. and 50% RH, the toner. accepting layer had surface resistivity of $5\times10^{14}$ Ω/□ and the antistatic treatment layer had surface resistivity of $7\times10^{10}$ Ω/□.

Label sheet-8 was evaluated in the same manner as in Example 1. Results are shown in Tables 1 and 2.

Comparative Example 1

Polyethylene terephthalate film (white PET film A; thickness: 50 μm) that had been suppressed in thermal shrinkage in advance by subjecting it to heat treatment was used as a label base. After an anchor coat layer was applied to the surface of a roll-shaped label base and then dried, a toner accepting layer coating liquid having the following composition was applied to the surface of the anchor coat layer with a coater so as to provide a thickness (after drying) of 7 μm and then dried. A resulting label body having a toner accepting layer was taken up into a roll.

Toner accepting layer coating liquid

Cation-type surfactant (Elegan264-WAX of NOF Corp.): 0.5 part

Polyester resin (NE382 of Kao Corp.; Tg: 60° C.; storage elastic modulus: 4 Pa): 10 parts Release agent (high-melting-point paraffin wax HNP-9 of Nippon Seiro Co., Ltd.; melting point 75° C.): 0.2 part Toluene: 90 parts Heat-resistant polyethylene terephthalate film Z (thickness: 75 μm) that had been reduced in thermal shrinkage in advance by subjecting it to heat treatment was used as a separator base. To form an antistatic treatment layer, a coating liquid having the following composition was applied to one surface of the separator base so as to provide a thickness (after drying) of 0.5 μm:

Polyester resin (Vylonal MD-1930 of Toyobo Co., Ltd.): 90 g

Mating agent (PMMA): 50 g

Cation-type surfactant (Elegan264-WAX of NOF Corp.): 1.0 g

Water: 10,000 g

Further, a 0.5-μm thick silicone resin layer was formed, as a release layer, on that surface of the separator base which was opposite to the surface on which the antistatic treatment layer was formed. A separator was thus formed.

Subsequently, an adhesive layer was formed on the surface of the release layer by applying an acrylic adhesive solution with a coater so as to provide a thickness (after drying) of 15 μm and then drying it. Then, the surface of the separator on which the adhesive layer was formed and that surface of the label body (wound in roll form) which was opposite to the toner accepting layer were bonded to each other with a laminator in such a manner as to avoid introduction of air into the adhesive layer. Label sheet-9 was thus produced.

In an environment of 23° C. and 50% RH the toner accepting layer had surface resistivity of $1\times10^{11}$ Ω/□ and the antistatic treatment layer had surface resistivity of $2\times10^{11}$ Ω/□.

Label sheet-9 was evaluated in the same manner as in Example 1. Results are shown in Tables 1 and 2.

Comparative Example 2

Label sheet-10 was produced in the same manner as in Example 1 except that a toner accepting layer liquid was applied so as to provide a thickness (after drying) of 1 μm, and was evaluated in the same manner as in Example 1. Results are shown in Tables 1 and 2.

Comparative Example 3

Label sheet-11 was produced in the same manner as in Example 1 except that a toner accepting layer liquid was applied so as to provide a thickness (after drying) of 30 μm, and was evaluated in the same manner as in Example 1. Results are shown in Tables 1 and 2.

Comparative Example 4

Polyethylene terephthalate film (white PET film A; thickness: 50 μm) that had been suppressed in thermal shrinkage in advance by subjecting it to heat treatment was used as a label base. After an anchor coat layer was applied to the surface of a roll-shaped label base and then dried, a toner accepting layer coating liquid having the following composition was applied to the surface of the anchor coat layer with a coater so as to provide a thickness (after drying) of 7 μm and then dried. A resulting label body having a toner accepting layer was taken up into a roll.

Toner accepting layer coating liquid
- Polyester resin FDX-1 of Kao Corp. (g, 65° C.; storage elastic modulus: 400 Pa): 10 parts
- Release agent (high-melting-point paraffin wax HNP-9 of Nippon Seiro Co., Ltd.; melting point: 75° C.): 0.2 part
- Toluene: 90 parts Heat-resistant polyethylene terephthalate film Z (thickness: 75 μm) that had been reduced in thermal shrinkage in advance by subjecting it to heat treatment was used as a separator base. To form an antistatic treatment layer, a coating liquid having the following composition was applied to one surface of the separator base so as to provide a thickness (after drying) of 0.5 μm:

- Polyester resin (Vylonal MD-1930 of Toyobo Co., Ltd.): 90 g
- Matting agent (PMMA): 50 g
- Cation-type surfactant (Elegan264-WAX of NOF Corp.): 1.0 g
- Water 10,000 g Further a 0.5-μm thick silicone resin layer was formed, as a release layer, on that surface of the separator base which was opposite to the surface on which the antistatic treatment layer was formed. A separator was thus formed.

Subsequently, an adhesive layer was formed on the surface of the release layer by applying an acrylic adhesive solution with a coater so as to provide a thickness (after drying) of 15 μm and then drying it. Then, the surface of the separator on which the adhesive layer was formed and that surface of the label body (wound in roll form) which was opposite to the toner accepting layer were bonded to each other with a laminator in such a manner as to avoid introduction of air into the adhesive layer. Label sheet-12 was thus produced.

In an environment of 23° C. and 50% RH, the toner accepting layer had surface resistivity of $8\times10^{14}$ Ω/□ and the antistatic treatment layer had su resistivity of $2\times10^{11}$ Ω/□.

Label sheet-12 was evaluated in the same manner as in Example 1. Results are shown in Tables 1 and 2.

Comparative Example 5

Polyethylene terephthalate film (white PET film A; thickness: 50 μm) that had been suppressed in thermal shrinkage in advance by subjecting it to heat treatment was used as a label base. After an anchor coat layer was applied to the surface of a roll-shaped label base and then dried, a toner accepting layer coating liquid having the following composition was applied to the surface of the anchor coat layer with a coater so as to provide a thickness (after drying) of 7 μm and then dried. A resulting label body having a toner accepting layer was taken up into a roll.

Toner accepting layer coating liquid
- Polyester resin (NE382 of Kao Corp.; Tg: 60° C.; storage elastic modulus: 4 Pa): 10 parts
- Release agent (high-melting-point paraffin wax HNP-9 of Nippon Seiro Co., Ltd.; melting point 75° C.): 0.2 part
- Toluene: 90 parts Heat-resistant polyethylene terephthalate film Z (thickness: 75 μm) that had been reduced in thermal shrinkage in advance by subjecting it to heat treatment was used as a separator base. To form an antistatic treatment layer, a coating liquid having the following composition was applied to one surface of the separator base so as to provide a thickness (after drying) of 0.5 μm:

- Polyester resin (Vylonal MD-1930 of Toyobo Co., Ltd.): 90 g
- Matting agent (PMMA): 50 g
- Water: 10,000 g Further, a 0.5-μm thick silicone resin layer was formed, as a release layer, on that surface of the separator base which was opposite to the surface on which the antistatic treatment layer was formed. A separator was thus formed.

Subsequently, an adhesive layer was formed on the surface of the release layer by applying an acrylic adhesive solution with a coater so as to provide a thickness (after drying) of 15 μm and then drying it. Then, the surface of the separator on which the adhesive layer was formed and that surface of the label body (wound in roll form) which was opposite to the toner accepting layer were bonded to each other with a laminator in such a manner as to avoid introduction of air into the adhesive layer. Label sheet-13 was thus produced.

In an environment of 23° C. and 50% RH, the toner accepting layer had surface resistivity of $4\times10^{14}$ Ω/□ and the mat treatment layer had surface resistivity of $2\times10^{15}$ Ω/□.

Label sheet-13 was evaluated in the same manner as in Example 1. Results are shown in Tables 1 and 2.

Comparative Example 6

Polyethylene terephthalate film (white PET film A; thickness: 50 μm) that had been suppressed in thermal shrinkage in advance by subjecting it to heat treatment was used as a label base. After an anchor coat layer was applied to the surface of a roll-shaped label base and then dried, a toner accepting layer coating liquid having the following composition was applied to the surface of the anchor coat layer with a coater so as to provide a thickness (after drying) of 7 μm and then dried. A resulting label body having a toner accepting layer was taken up into a roll.

Toner accepting layer coating liquid
- Cation-type surfactant (Elegan 264-WAX of NOF Corp.): 0.5 part
- Polyester resin (NE382 of Kao Corp.; Tg: 60° C.; storage elastic modulus: 4 Pa): 10 parts Release agent (high-melting-point paraffin wax HNP-9 of Nippon Seiro Co., Ltd.; melting point: 75° C.): 1 part Toluene: 90 parts Heat-resistant polyethylene terephthalate film Z (thickness: 75 μm) that had been reduced in thermal shrinkage in advance by subjecting it to heat treatment was used as a separator base. To form an antistatic treatment layer, a coating liquid having the following composition was applied to one surface of the separator base so as to provide a thickness (after drying) of 0.5 μm:

laminator in such a manner as to avoid introduction of air into the adhesive layer. Label sheet-14 was thus produced.

In an environment of 23° C. and 50% RH, the toner accepting layer had surface resistivity of $1\times10^{11}$ Ω/□ and the antistatic treatment layer had surface resistivity of $2\times10^{15}$ Ω/□.

Label sheet-14 was evaluated in the same manner as in Example 1. Results are shown in Tables 1 and 2.

Comparative Example 7

Label sheet-15 was produced in the same manner as in Example 1 except that no release agent is used, and was evaluated in the same manner as in Example 1. Results are shown in Tables 1 and 2.

TABLE 1

| | Ex. 1 | Ex. 2 | Ex. 3 | Ex. 4 | Ex. 5 | Ex. 6 | Ex. 7 | Ex. 8 |
|---|---|---|---|---|---|---|---|---|
| Label base | 50-μm thick white PET A | | | | | | | |
| Separator base | 75-μm thick heat-resistant PET Z | | | | | | | |
| Thickness (μm) of toner accepting layer | 7 | 3 | 7 | 7 | 7 | 15 | 7 | 7 |
| Storage elastic modulus (Pa) of toner accepting layer resin | 4 | 4 | 4 | 4 | 4 | 4 | 4 | 250 |
| Tg (° C.) of toner accepting layer | 60 | 60 | 60 | 60 | 60 | 60 | 60 | 85 |
| Melting point (° C.) of release agent | 75 | 75 | 82 | 75 | 75 | 75 | 55 | 75 |
| Amount (parts by mass) of release agent | 2 | 2 | 2 | 5 | 2 | 2 | 2 | 2 |
| Surface resistivity (Ω/□) of toner accepting layer | $4 \times 10^{14}$ | $4 \times 10^{14}$ | $4 \times 10^{14}$ | $4 \times 10^{14}$ | $4 \times 10^{14}$ | $4 \times 10^{14}$ | $4 \times 10^{14}$ | $5 \times 10^{14}$ |
| Surface resistivity (Ω/□) of antistatic treatment layer | $1 \times 10^{11}$ | $1 \times 10^{11}$ | $1 \times 10^{11}$ | $1 \times 10^{12}$ | $2 \times 10^{11}$ | $1 \times 10^{11}$ | $1 \times 10^{12}$ | $7 \times 10^{10}$ |
| Thickness (μm) of anchor coat layer | 1 | 1 | 1 | 1 | 1 | 1 | 1 | 1 |
| Toner transfer performance | A | A | A | A | A | A | A | A |
| Image gloss uniformity | A | A | A | A | A | A | A | A |
| Toner fixing performance | A | A | A | A | A | A | A | A |
| Blocking | A | A | A | A | A | A | A | A |
| Winding around primary fuser | A | A | A | A | A | A | A | A |
| Problem in secondary fuser | A | A | A | A | A | A | A | A |

TABLE 2

| | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|
| Label base | 50-μm thick white PET A | | | | | | |
| Separator base | 75-μm thick heat-resistant PET Z | | | | | | |
| Thickness (μm) of toner accepting layer | 7 | 1 | 30 | 7 | 7 | 7 | 7 |
| Storage elastic modulus (Pa) of toner accepting layer resin | 4 | 4 | 4 | 400 | 4 | 4 | 4 |
| Tg (° C.) of toner accepting layer | 60 | 60 | 60 | 107 | 60 | 60 | 60 |
| Melting point (° C.) of release agent | 75 | 75 | 75 | 75 | 75 | 75 | — |
| Amount (parts by mass) of release agent | 2 | 2 | 2 | 2 | 2 | 10 | — |
| Surface resistivity (Ω/□) of toner accepting layer | $1 \times 10^{11}$ | $8 \times 10^{14}$ | $4 \times 10^{14}$ | $8 \times 10^{14}$ | $4 \times 10^{14}$ | $1 \times 10^{11}$ | $7 \times 10^{14}$ |
| Surface resistivity (Ω/□) of antistatic treatment layer | $2 \times 10^{11}$ | $1 \times 10^{11}$ | $1 \times 10^{11}$ | $2 \times 10^{11}$ | $2 \times 10^{15}$ | $2 \times 10^{15}$ | $2 \times 10^{11}$ |
| Thickness (μm) of anchor coat layer | 1 | 1 | 1 | 1 | 1 | 1 | 1 |
| Toner transfer performance | B | A | A | A | C | C | A |
| Image gloss uniformity | A | C | — | — | A | B | — |
| Toner fixing performance | C | A | — | — | A | A | — |
| Blocking | A | A | A | A | A | A | A |
| Winding around primary fuser | A | A | C | B | A | A | C |
| Problems in secondary fuser | A | C | — | — | A | C | — |

Polyester resin (Vylonal MD-1930 of Toyobo Co., Ltd.): 90 g

Matting agent (PMMA): 50 g

Water 10,000 g

Further, a 0.5-μm thick silicone resin layer was formed, as a release layer, on that surface of the separator base which was opposite to the surface on which the antistatic treatment layer was formed. A separator was thus formed.

Subsequently, an adhesive layer was formed on the sue of the release layer by applying an acrylic adhesive solution with a coater so as to provide a thickness (after drying) of 15 μm and then drying it. Then, the surface of the separator on which the adhesive layer was formed and that surface of the label body (wound in roll form) which was opposite to the toner accepting layer were bonded to each other with a The results of Examples 1 to 8 show that the label sheet according to the invention is very good, because not only does it exhibit satisfactory performance in both of the toner transfer and the toner fixing but also it does not cause such trouble as winding around the fuser in an electrophotographic apparatus. The label sheets of Comparative Examples are inferior in performance to the label sheet for electrophotographic process according to the invention, because the former is poor in blocking, causes trouble in an apparatus, or, even if they do not cause such trouble, causes a problem in toner transfer performance, for example.

In the invention, both of the label body and the separator are made of heat-resistant resin film, proper balance is established between the surface resistivity values of the front and back surfaces, the toner accepting layer containing a release agent is provided, and Tg, the storage elastic modulus, etc. of a thermoplastic resin that forms the toner accepting layer are set suitable for electrophotographic copiers and printers having an oilless fuser. As a result, the invention can provide a label sheet that provides good toner transfer performance, enables production of images with uniform gloss, does not cause such trouble as winding around a primary fuser, and prevents a toner accepting element from remaining on the belt of a belt-type fuser. The invention can also provide an image forming method using such a label sheet for electrophotographic process.

The entire disclosure of Japanese Patent Application No. 2002-134108 filed on Jun. 25, 2002 including specification, claims, drawings and abstract is incorporated herein by reference in its entirety.

What is claimed is:

1. A label sheet for an electrophotographic process comprising a label body and a separator, wherein the label body comprises:

a label base containing a heat-resistant resin film;

an adhesive layer formed over a back surface of the label base; and a toner accepting layer that is formed on a front surface of the label base, the toner accepting layer containing a thermoplastic resin having storage elastic modulus at 130° C. of in a range of 4 to 250 Pa, wherein the toner accepting layer has a thickness of 2 to 16 μm and surface resistivity of $1\times10^{14}$ Ω/□ or more, and contains a release agent, and wherein the separator is removably bonded to the label body with the adhesive layer interposed in between so as to be peelable from the label body, and comprises:

a separator base containing heat-resistant resin film; and an antistatic treatment layer that is formed on one surface of the separator base, the antistatic treatment layer is removably bonded to the label body, and having surface resistivity of $1\times10^{8}$ to $1\times10^{12}$ Ω/□.

2. The label sheet for an electrophotographic process according to claim 1, wherein the release agent is contained in the toner accepting layer in an amount of 1 to 5 wt %.

3. The label sheet for an electrophotographic process according to claim 1, wherein the release agent has a melting point of 50 to 90° C.

4. The label sheet for an electrophotographic process according to claim 1, wherein the thermoplastic resin has a glass transition temperature of 50 to 90° C.

5. The label sheet for an electrophotographic process according to claim 1, wherein the heat-resistant resin film contains a filler.

6. The label sheet for an electrophotographic process according to claim 1, wherein the label base has a thickness of 25 to 150 μm.

7. The label sheet for an electrophotographic process according to claim 1, the label body has an anchor coat layer that is located between the toner accepting layer and the label base.

8. The label sheet for an electrophotographic process according to claim 1, wherein the adhesive layer has a thickness of 5 to 30 μm.

9. The label sheet for an electrophotographic process according to claim 1, wherein the separator base has a thickness of 25 to 150 μm.

10. The label sheet for an electrophotographic process according to claim 1, the label sheet has a release layer that has a thickness of 0.05 to 1 μm and is located between the adhesive layer and the separator base.

11. An image forming method for forming an image on a label sheet for an electrophotographic process, the image forming method comprising the steps of:

forming a latent image on a latent image holding member;

developing the latent image using a toner;

transferring a toner image to a front surface of a toner accepting layer of a label sheet; and fixing the toner image on the toner accepting layer by heating and melting the toner image with a fixing device, and the label sheet comprising a label body and a separator, wherein the label body comprises:

a label base containing a heat-resistant resin film;

an adhesive layer formed over a back surface of the label base; and a toner accepting layer that is formed on a front surface of the label base, the toner accepting layer containing a thermoplastic resin whose storage elastic modulus at 130° C. is in a range of 4 to 250 Pa, wherein the toner accepting layer has a thickness of 2 to 16 μm and surface resistivity of $1\times10^{14}$ Ω/□ or more, and contains a release agent; and wherein the separator is removably bonded to the label body with the adhesive layer interposed in between so as to be peelable from the label body, and comprises:

a separator base containing a heat-resistant resin film; and an antistatic treatment layer that is formed on one surface of the separator base that is removably bonded to the label body, and having surface resistivity of $1\times10^{8}$ to $1\times10^{12}$ Ω/□.

12. The image forming method according to claim 11, wherein the fixing step comprises the substep of performing secondary fixing with a belt-type fixing device after the toner image has been fixed primarily with the fixing device.

13. The image forming method according to claim 12, wherein the belt-type fixing device comprises a heating roll and a pressure roll that are brought into pressure contact with each other with a fixing belt interposed in between by a pressing unit with a nip pressure of 100 to 200 kPa.

14. The image forming method according to claim 13, wherein the fixing belt is tensely wound on the heating roll, a peeling roll, and a steering roll in a rotatable manner.

15. The image forming method according to claim 11, wherein the release agent is contained in the toner accepting layer in an amount of 1 to 5 wt %.

16. The image forming method according to claim 11, wherein the release agent has a melting point of 50 to 90° C.

17. The image forming method according to claim 11, wherein the thermoplastic resin has a glass transition temperature of 50 to 90° C.

18. The image forming method according to claim 11, wherein the heat-resistant resin film contains a filler.

19. The image forming method according to claim 11, wherein the label base has a thickness of 25 to 150 μm.

* * * * *